July 5, 1966　　　B. K. BOGGILD ET AL　　　3,258,835
PNEUMATIC TOOL ESPECIALLY FOR INSERTING ANTI-SKID
STUDS IN A RUBBER TIRE
Filed Sept. 28, 1964　　　　　　　　　　　　　　7 Sheets-Sheet 1
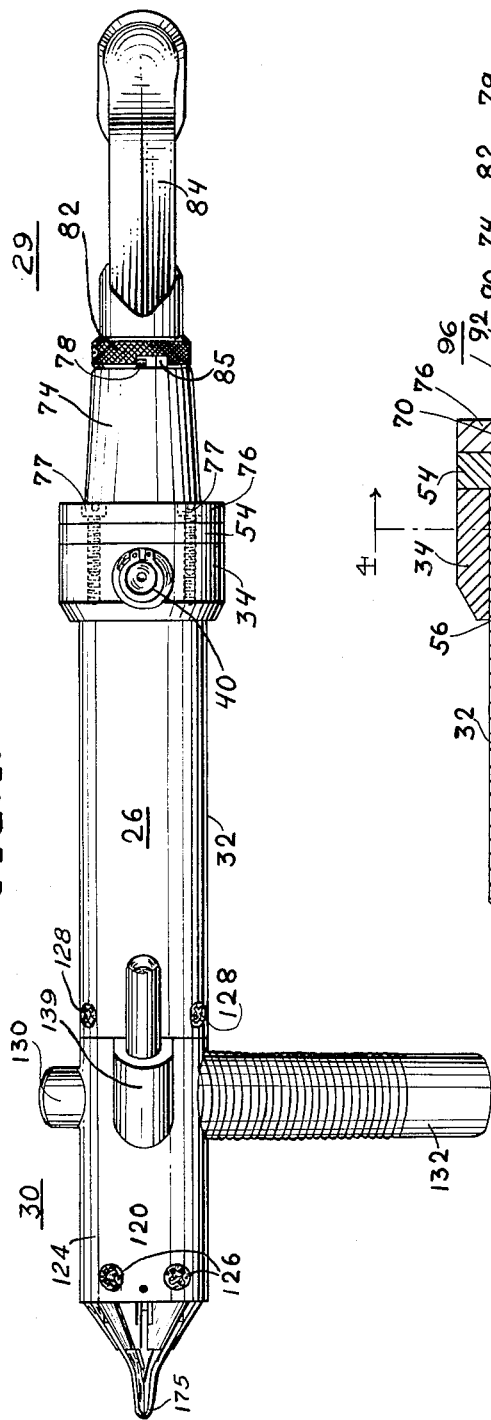
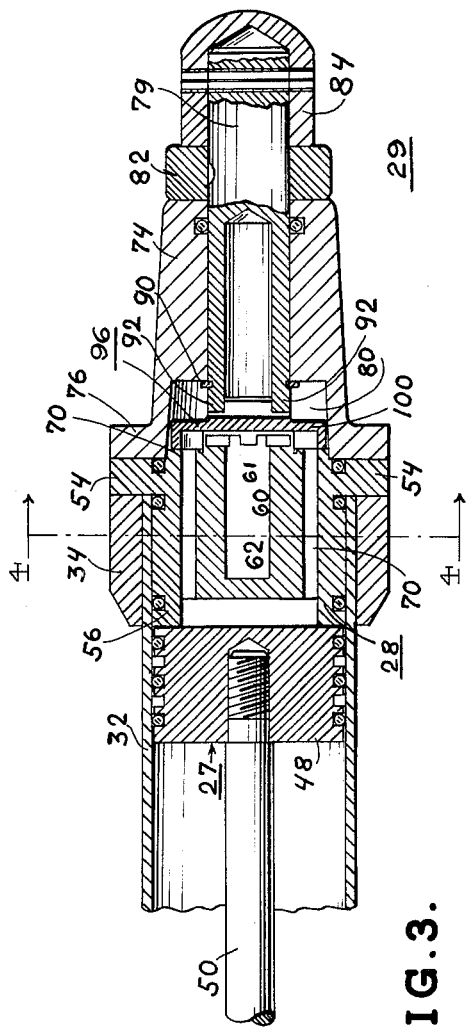
INVENTORS
Birger K. Boggild
Giovanni Gidoni
Joseph J. Gyorik

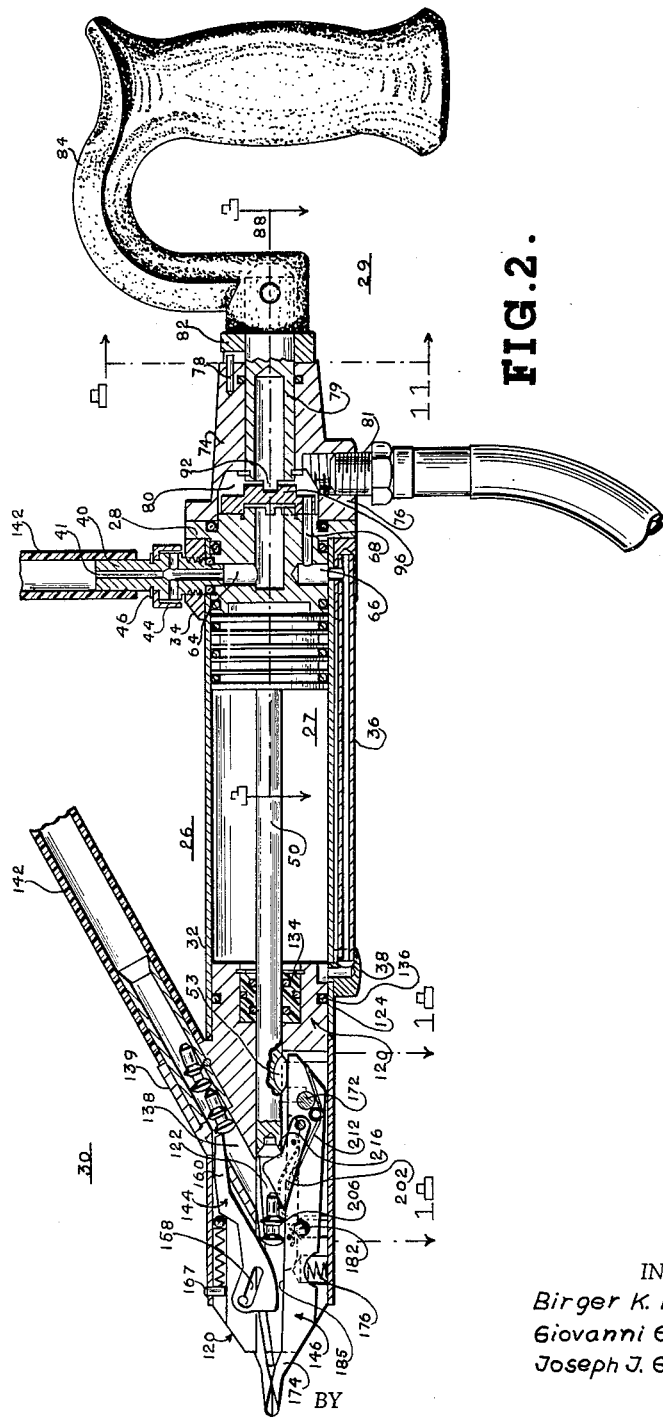

July 5, 1966
B. K. BOGGILD ET AL
3,258,835
PNEUMATIC TOOL ESPECIALLY FOR INSERTING ANTI-SKID
STUDS IN A RUBBER TIRE
Filed Sept. 28, 1964
7 Sheets-Sheet 3
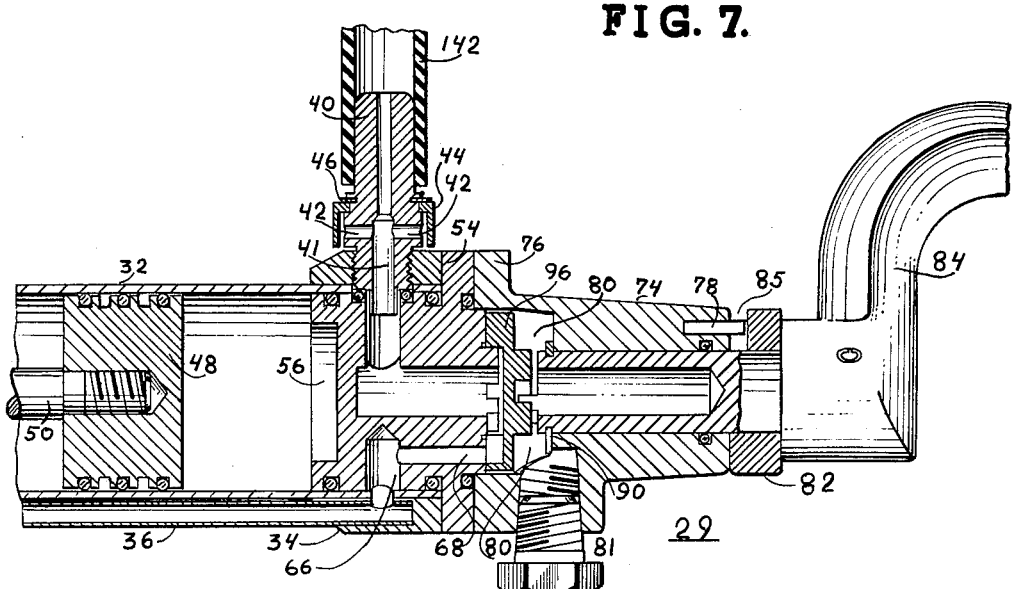
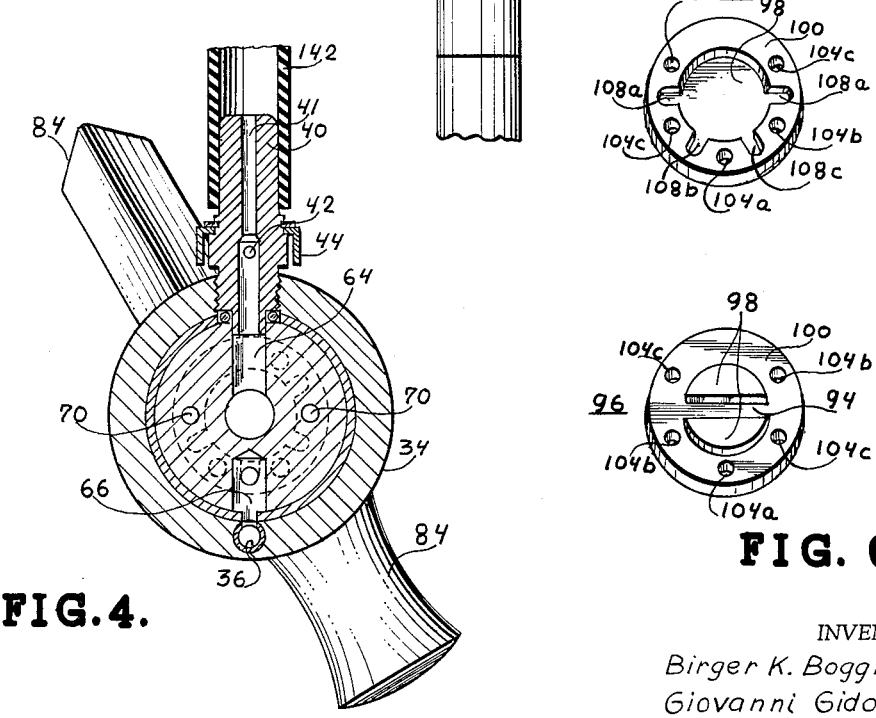
INVENTORS
Birger K. Boggild
Giovanni Gidoni
Joseph J. Gyorik INVENTORS
Birger K. Boggild
Giovanni Gidoni
Joseph J. Gyorik July 5, 1966 B. K. BOGGILD ET AL 3,258,835
PNEUMATIC TOOL ESPECIALLY FOR INSERTING ANTI-SKID
STUDS IN A RUBBER TIRE
Filed Sept. 28, 1964 7 Sheets-Sheet 5

INVENTORS
Birger K. Boggild
Giovanni Gidoni
Joseph J. Gyorik.

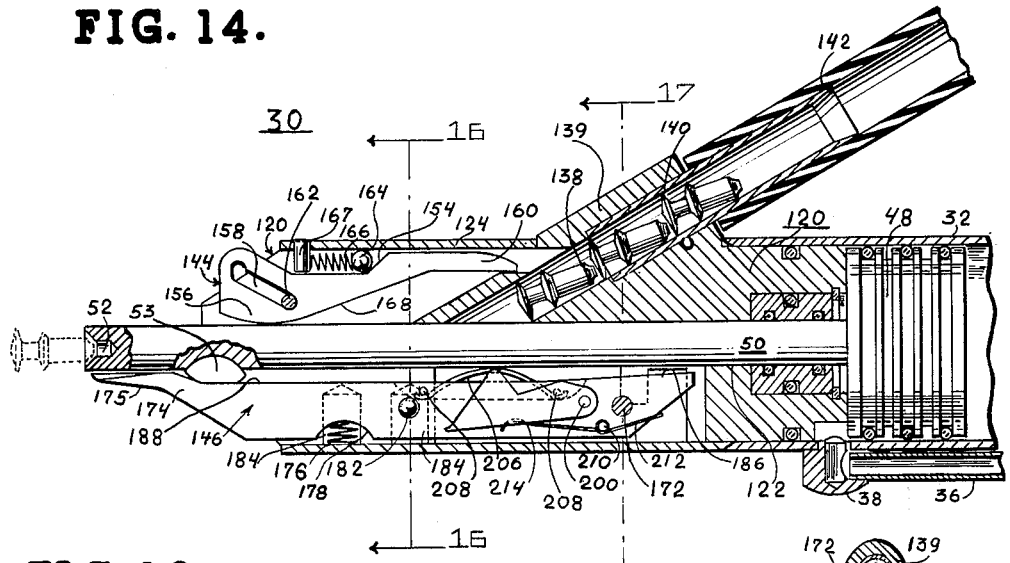
FIG. 14.
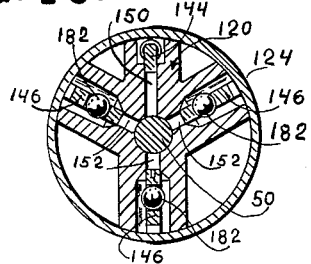
FIG. 16.
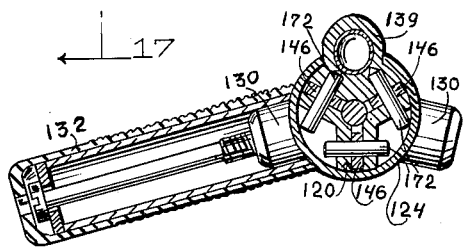
FIG. 17.
FIG. 18.
INVENTORS
Birger K. Boggild
Giovanni Gidoni
Joseph J. Gyorik

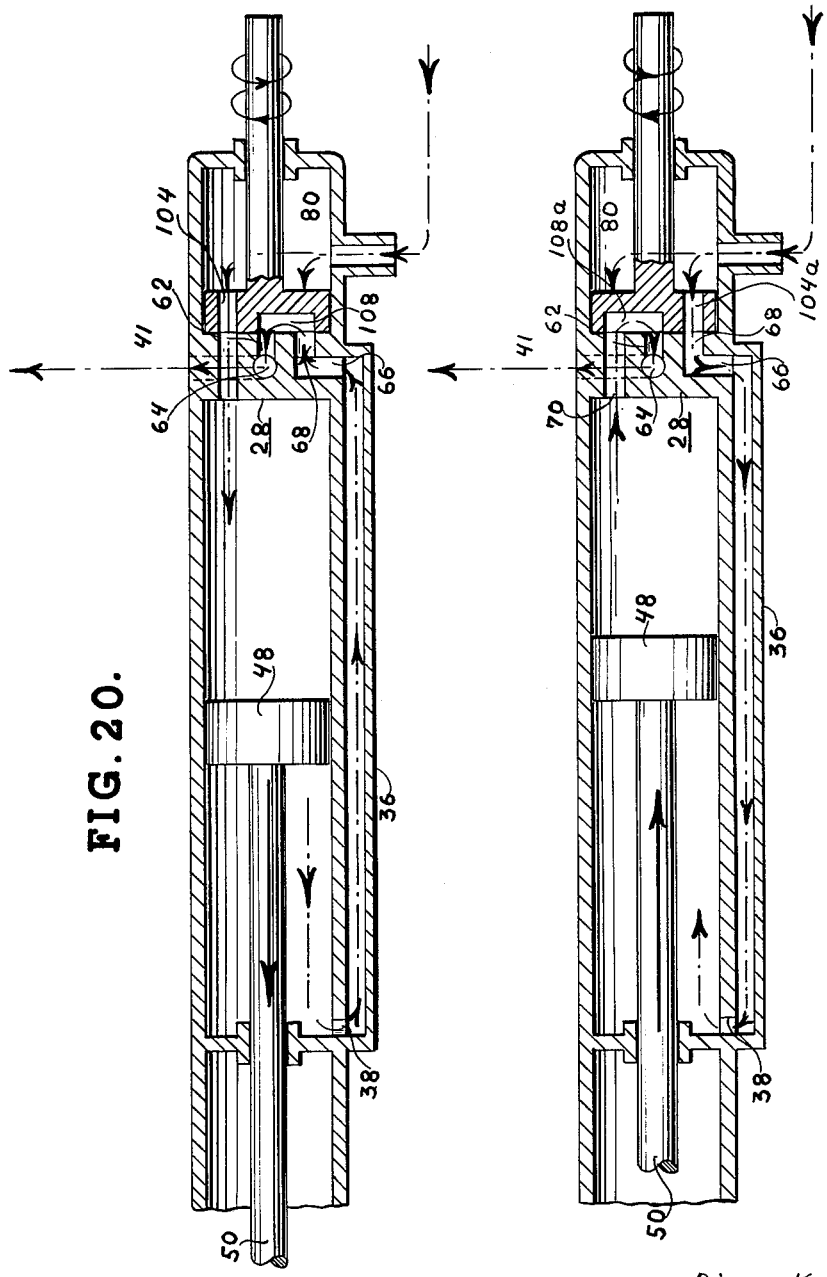

3,258,835
PNEUMATIC TOOL ESPECIALLY FOR INSERTING ANTI-SKID STUDS IN A RUBBER TIRE
Birger K. Boggild and Giovanni Gidoni, Charles County, Md., and Joseph J. Gyorik, Washington, D.C., assignors to Firearms International Corporation, Oxon Hill, Md., a corporation of Delaware
Filed Sept. 28, 1964, Ser. No. 399,773
9 Claims. (Cl. 29—212)

This invention generally relates to semi-automatic pneumatic tools; and more particularly the invention relates to a portable semi-automatic pneumatic tool for placing a plurality of small anti-skid devices, hereinafter called studs, in the outer rubber tread of a tire or the like. A tool of this nature is herein called a stud gun.

Anti-skid studs to be placed in the tread of a tire are known; and U.S. Patent No. 3,125,147, of March 17, 1964, describes a form of such a stud and shows a portion of a rubber tire provided with numerous surface-exposed holes that can receive the studs. The holes may be premolded or bored into the tire and are diametrically smaller and usually lengthwise shorter than the studs they receive.

In general, such an anti-skid stud is a rigid composite body having a shape similar to a rivet or a headed bolt and comprises an outer cylindrical jacket tightly holding a hard, wear-resistant central rod with an end of the rod protruding from the jacket. The jacket may have one or more grooves or flanges or both on its outside. A flange may be used as the end head of the stud and may be in the shape of a ring, disc, cone or some other shape, and may be relatively thick and rigid or fairly thin.

Usually the studs are individually inserted in appropriate holes in the tread of a tire. Each insertion or assembly is accomplished by forcibly spreading or stretching the rubber defining the hole, inserting the stud while the rubber is so spread, and then withdrawing the rubber-spreading force so that the resiliency of the rubber tends forcibly to restore the hole towards its normal size, and so causes the rubber to close or compress tightly about the stud with its flanges anchored in the rubber.

With properly sized holes and studs, properly assembled, only the protruding ends of the central rods of the studs are at the tread-surface of the tire. The materials for the central rods are chosen for their hardness and long wearing qualities in use, so as to provide long-lived anti-skid action especially on icy and slippery road surfaces. There are a number of suitable materials of which tungsten carbide is an example.

The insertion of the studs into the holes is not an easy task, and tools, or stud guns, have been devised for the purpose. These guns are usually powered by pneumatic operated means or spring-operated means or both, the operations being finger controlled through a trigger or the like. It is an object of the present invention described herein to provide an improved pneumatically powered tool, or stud gun, for placing anti-skid studs or similar items in a rubber object such as a tire.

It is an object of the invention to provide a portable stud gun by which studs can be easily and correctly placed in the holes of a tire from a repeating feed magazine carried by the gun and capable of containing a large supply of studs that are automatically passed one by one through the gun upon succeeding operations of the gun.

Studs on the market today for use as anti-skid devices in a tire are available in different lengths, different diameters, and different shapes, and in combination thereof. When desired, studs may be specially designed for a particular purpose. It is an object of the invention to provide a single stud gun which is highly versatile, being capable of properly handling any of a number of different types of studs.

A particular type of stud that is difficult properly to place in a tire is a stud having a length not much, if any, longer than its diameter. A stud gun in accordance with the invention can readily and properly handle such stubby studs.

A second type of stud that is difficult properly to place in a tire is a stud having a single thin flange or a sharp edged flange or both. In passing through a stud gun such a stud may be deeply marked or burred or otherwise marred. Such blemishes, even when the stud is properly placed in the tire, will cut the rubber holding the stud, and decrease the life of the tire or stud because of the repeated rocking action of the stud in the tire as the tire turns over and over a great many times. A stud gun in accordance with the invention can readily and reliably insert such studs in a tire without damaging the studs.

A further object of the invention is to provide a portable stud gun having a feed mechanism for feeding the studs to a tire, the feeding mechanism being reliable in the different normal orientations that a gun must assume in practice. The gun is such that there is no condition which would cause a stud to jam in it whatever inclination it is held in normal operation.

A portable stud gun of a general type herein described comprises an outer housing comprising a cylindrical tube in which a piston means is pneumatically reciprocable from a position at a back portion of the tube to a stud-inserting position at the front or forward portion. Preferably, the pneumatic power is air under pressure. The application of the pneumatic power is under control of a manually-operated activator or actuator means which when placed in one position causes the piston means to move in its forward or working stroke and when placed in a second position causes the piston means to move in its return or back stroke. In its forward stroke the piston means picks up a single stud from the stud-feed mechanism of the gun and forces it through rubber-spreading jaws at the front end into a tire hole. In its backward stroke, the piston means causes the stud-feed mechanism to release another stud to be picked up in the next forward stroke.

The tire as a rule has a large number of such holes, perhaps as many as several hundred or so, and the air pressure required to operate the stud gun may be considerable, as much as eighty pounds or more per square inch. Under such circumstances, constant operation of a gun controlled by a finger-pressed trigger causes an operator's finger and/or arm to become fatigued quickly, especially since the gun's jaws must also be pressed by the operator into the stud-receiving hole.

The actuator means of the present invention is such that the operator can repeatedly operate the gun continuously with comparatively very little effort or fatigue. To this end, the actuator means is provided with a valve means which is activated not by a person's finger or fingers but by a slight twist of the wrist. As an additional feature, the actuator means may be easily changed from righ-handed operation to left-handed operation and vice versa. The novel actuator means is made of components of broad application to other portable devices which are pneumatically operated to each of several positions by independent manual control. Moreover, the arrangements for twisting the actuator means provides that the operator always twists his hand away from his body for one working stroke, and then twists its back for the other return stroke, irrespective of whether the operation is left-handed or right-handed.

A further advantage of the invention resides in the gun automatically recoiling or kicking back upon insertion of a stud in the tire, so that the operator is not required to pull the gun away from or out of the tire hole, as in prior stud guns, thereby further reducing the manual effort required to operate the gun.

A still further advantage of the invention is the provision of a stud gun having the foregoing objects, features and advantages, but which nevertheless is light in weight, rugged, low in initial costs and maintenance costs, and reliable and rapid in operation.

Additional novel features, innovations, components and advantages of the invention will be apparent from the following description thereof to be taken with reference to and in conjunction with the accompanying drawings, the figures of which, except for FIGS. 20 and 21, are to scale although not necessarily to the same scale. In the drawings:

FIG. 1 is a plan view of a stud gun in accordance with the invention, but with a stud feed hose omitted;

FIG. 2 is a vertical longitudinal view, partly in elevation, of the stud gun with its piston means and activator means in start or back position;

FIG. 3 is a sectional view substantially on the line 3—3 of FIG. 2;

FIG. 4 is a sectional view substantially on the line 4—4 of FIG. 3;

FIGS. 5 and 6 are front and back perspective views, respectively, of a valve plate in the actuator means, with the plate in the position it occupies in FIG. 2;

FIG. 7 is a sectional view corresponding to the right hand part of FIG. 2 when the actuator means has been twisted so that the piston means is in an intermediate position in its housing;

FIG. 14 is a sectional view of the left side of FIG. 2, but with the piston means in forward or front-most position;

FIG. 16 is a sectional view substantially on the line 16—16 of FIG. 14;

FIG. 17 is a sectional view substantially on the line 17—17 of FIG. 14;

FIG. 18 is a sectional view substantially on the line 18—18 of FIG. 2;

Figure 8:
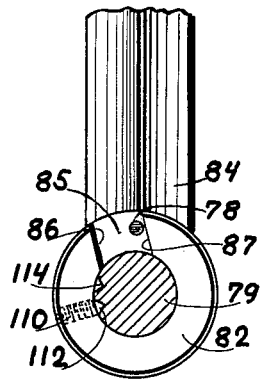
FIGS. 8 and 9 are sectional views on the line 8–11 of FIG. 2 showing positions of part of the actuator means set to move the piston means backward and forward, respectively, with left handed operation.

FIGS. 19a through e are views showing a few of the various anti-skid studs utilizable in the stud gun;

FIG. 20 is a schematic view for indicating the flow of air through the various air passages of the stud gun for moving the piston means forward; and FIG. 21 is a schematic view for indicating the flow of air through the stud gun for moving the piston means backward.

With special reference to FIGS. 1 and 2, the preferred form of stud gun in accordance with the invention, to which the full invention is not limited, comprises a main cylindrical housing 26, a piston means 27, reciprocable in the housing, a base block 28 at the back end of the housing, an actuator means 29 at the back end of the gun and manually controlled to activate the piston means, and a head assembly 30 at the front end of the gun and through which a stud is delivered to the tire by each forward movement of the piston means. In this paragraph, each reference numeral indicates the associated component in its entirety.

The main housing 26 comprises a circular outer tube 32, preferably of steel, a short outer ring 34 secured to the back end of tube 32 and providing a thick wall thereat, an air pipe 36 along the bottom of tube 32, and an air connector fitting 38 air-tightly receiving the front end of the tube 32. The other end of pipe 36 is secured air-tightly in a bottom cavity in ring 34. The cavity in the fitting 38 is in direct open communication with the front space in tube 32. In the preferred embodiment, the tube 32 had an inside diameter of 1.50 inches.

The main housing 26 may also be considered to comprise a return air nipple 40 screwed into a suitable hole in the top of the ring 34 and passing through a hole in tube 32. The nipple 40 has an axial passage or hole 41 communicating with a passage in the base block 28. As shown in FIGS. 2 and 7, the nipple 40 also has a pair of small radial holes 42 and a protective cap 44 having a cylindrical portion spaced from nipple 40 so as to provide an air-diverting vent to atmosphere having an outlet directed generally downward and away from the face of an operator or a nearby person. The cap is held in place by a retainer ring 46.

The piston means 27 comprises a cylindrical piston 48, preferably of an aluminum alloy, and a piston or plunger rod 50, preferably of steel. The piston is slideable along smoothly finished inner surface of tube 32 of the main cylindrical housing 26, the piston being moveable between positions abutting the base block 28 or the head assembly 30. The piston has a plurality of O-rings on its outside to provide lubrication and sealing action. The piston rod 50 is rigidly unitary with the piston and extends axially forwardly therefrom into a circular axial hole or barrel bore in the head assembly 30 in which the rod is slideable. The working or front end or face of piston rod 50 has a stud positioning groove 52. Near and equally distant from the front end of the piston rod, it has a plurality, specifically three, of grooves which are equally circumferentially spaced. The grooves are semi-cylindrical with axes perpendicular to the piston rod. Each groove closely but turnably receives a fitting portion of a jaw-actuating key or cam 53, as is shown in FIGS. 2 and 14. In the figures one cam only is shown for clarity.

As shown more particularly in FIGS. 2 through 7, the base block 28 may be an aluminum alloy block comprising a main body portion that fits inside the back end of tube 32, an annular flange 54 that abuts the back faces of tube 32 and ring 34, a forwardly-extending circular rim 56 forming a stop for the piston means, and a central backwardly-extending toothed rim 60 which with the remaining outer front face of the base block forms an outer annular valve seat subsequently mentioned. The rim 60 has slots 61 between tis teeth for air passage.

The base block 28 has certain connecting air passages under control of the valve oscillable on the valve seat. These passages include a central passage 62 open at the back but closed at the front of the base block, a radial passage 64 extending from passage 62 to meet the hole 41 in nipple 40, a radial passage 66 diametrically opposite passage 64 and communicating with air pipe 36, and a longitudinal passage 68 extending from passage 66 to the valve seat. As shown in FIG. 3 the base block also has a pair of diametrically opposite, longitudinal, through passages 70. The direction and/or flow of air through the various passages in the base block 28 is controlled by the actuator means 29. The actuator means 29 comprises relatively stationary and twistable components or parts, the twistable component controlling the movement of the piston means.

With particular reference to FIGS. 1, 2, 3 and 7, the stationary component comprises a housing body 74 having an annular flange 76 that abuts flange 54 of base block 28 that in turn abuts the back ends of ring 34 and tube 32 so that the housing body 74, base block 28 and main housing 26 can be firmly secured together into a unit by a plurality of screws 77, only two of which are shown in FIG. 1. In a hole at the back end of the housing body 74 a stop pin 78 is secured.

The housing body 74 has a central hole that rotatably receives the twistable component of the actuator means. This part comprises a valve-operating shaft or axle 79 in the said central hole that has one end projecting into a hollow space or air chest 80 in the body 74. The body 74 has a hole that air-tightly receives a nipple 81 open to the air chest 80 to which an air supply hose may be removably secured in any suitable manner.

The back end of shaft 79 extends beyond the body 74 so as to receive a hand-selector ring 82 and a manually operable grasping means 84 identified hereinafter as a handle. The ring 82 has a short slot 85 into which pin 78 extends, the slot having radial side walls 86 and 87. The handle 84 is fixed to the shaft 79 by a pin 88 driven through fitting holes in the handle and shaft. A retaining ring 90 in a circular slot in one end of shaft 79, and the selector ring and handle at the other end restrict longitudinal movement but permit twisting or turning movement of shaft 79. This twisting is, however, limited by the pin 78 striking a wall 86 or 87.

The front end of shaft 79 is hollowed out to reduce its weight but it has two projecting teeth 92 at its periphery that fit in a slot 94 in a valve 96 so as to twist the valve whenever the handle 84 is twisted. The valve 96 is coaxial with the shaft 79; but can also be said to be associated with base block 28.

As shown in FIGS. 5 and 6, the valve 96 has a central cylinder portion 98 which is solid except for the aforesaid slot 94, and has an outer annular valve part 100 integral with but stepped forwardly of portion so that the latter clears the rim 60 of the base block 28. The annular valve part 100 has a flat face against and slideable on the back face or valve seat of the base block 28 to different settings for selecting in which of the passages in the base block air will flow in the different positions of the handle 84. To this end, the valve part 100 has a plurality of through ports 104–a—c and has a plurality of shallower bridge grooves 108–a—c which are open only at the front and inner faces of the valve part. The through ports comprise bottom port 104–a, paired ports 104–b, and paired ports 104–c. The grooves comprise paired grooves 108–a, a slanting groove 108–b associated with ports 104–b, and a slanting groove 108–c associated with ports 104–c in operation of the stud gun.

The actual movement of the valve 96 is obviously controlled by a twist of handle 84, but the setting of selector ring 82 having positioning slot 85 determines whether the handle is set for left hand or right hand operation.

As more particularly shown in FIGS. 8–11 the selector ring 82 is set by fixing it in either of two positions on shaft 79 turned by handle 84. For this purpose, the ring receives a set screw 110 that may be tightly screwed in either of two holes 112 and 114 in the outside of shaft 79 which are angularly displaced by the required degree of twist which is also the span of slot 85 in the ring 80.

Figure 9:
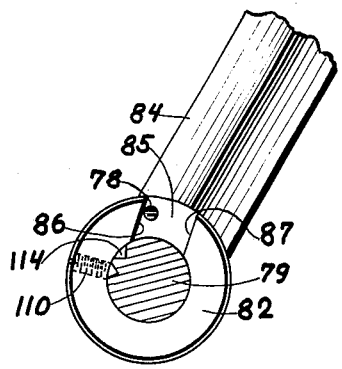
Figure 10:
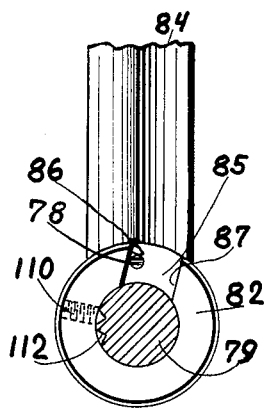
FIGS. 10 and 11 are views corresponding to FIGS. 8 and 9 but with the actuator means set for right handed operation.
Figure 11:
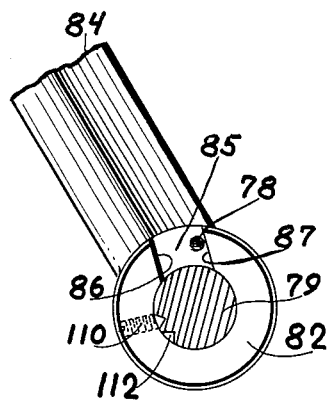

For left hand operation as shown in FIGS. 8 and 9, the set screw 110 is in hole 112, so that in vertical position of handle 84 the stop pin 78 engages the wall 87 of slot 85. Then by twisting the handle with the left hand away from the body, the handle moves the valve 96 until the stop pin 78 engages wall 86 of slot 85; and the valve 96 interconnects the air passages in the base block 28 so that the piston means 27 moves forward. By twisting the handle back to vertical the piston means is brought back. For right hand operation as shown in FIGS. 10 and 11, the set screw is in hole 114, so that in back position of piston means 27 the stop pin 78 engages wall 86, and in forward position the pin engages wall 87.

In both left and right handed operation, the handle is always in a vertical position when the piston means is back, and the handle is moved away from the body to move the piston means forward to insert a stud.

In the vertical position of handle 84 of the actuator means 29, shaft 79 and valve 96 occupy the same position irrespective of whether the stud gun is set for left or right handed operation. This may be observed in FIGS. 8 and 10 where the positions of the set screw holes 112 and 114 are alike. With this setting, when an air hose is affixed to nipple 81, and air under pressure is supplied, the air will flow (with reference to FIGS. 2, 3, 5, 7, 20 and 21) into air chest 80, through bottom port 104–a in the valve 96, passage 68, passage 66, pipe 36, fitting 38, into the front part of tube 32 and against the front face of the piston 48; thereby pressing the piston means backwards so that it abuts rim 56 of base block 28. In this operation, the annular valve part 100 of valve 96 blocks all other possible paths from the air chest 80.

As the piston means moves backward, air in tube 32 in back of the piston 48 is vented through a path including passages 70, horizontal bridging grooves 108–a, slots 61, passages 62, 64 and 41, radial passages 42, and the peripheral space under cap 44 to atmosphere. It is to be noted that air under pressure will be present in hole 41 and nipple 40. As later described, this air pressure also assures a feeding of studs to the front or working end of the stud gun.

In the foregoing air paths, it should be noted that passage 68 is always in open air communication with the space in tube 32 in front of piston 48; and that passage 62 is always in open air communication to atmosphere under cap 44 and to passage 41.

The piston means is moved forwardly from its back position by a twist or turn of the handle 84 either to the right or left as far as stop pin 78 will allow, as indicated in FIGS. 9 and 11. The annular valve part 100 now connects passage 68 to passage 62 by either groove 108–b or 108–c depending on whether the handle has been twisted to the right or left. In either case, a vent path obtains from the front of the piston 48 to atmosphere under cap 44. This vent path also supplies air under pressure to hole 41.

Air under pressure from air chest 80 is now delivered to the back face of piston 48 via either ports 104–b or 104–c, depending on whether the handle 84 has been twisted to the right or left, and passages 70 and which the ports are now aligned. Consequently the piston means is driven forward and can deliver power to the working end of the tool, namely the head assembly 30.

The piston means is obviously brought back by return twist of handle 84 to its vertical position; and by so alternately twisting the handle back and forth at will, the piston means is reciprocated at will or as many times as the operator wishes; and it has been found with much less effort or fatigue than is caused by finger-operated or similarly activated tools of a similar general nature.

It is also to be noted that the vent passages for air in both strokes of the piston means comprises passage 62 and a groove passage 108–b or 108–c. Consequently, air under pressure acting on the front of valve 96 tends to counterbalance the air under pressure acting on the back of the valve exposed to air chest 80.

The front or working end of piston rod 50 moves back and forth in head assembly 30. As shown in FIGS. 1, 2 and 12–18, the head assembly 30 comprises a head block 120, preferably of an aluminum alloy, having an axial piston rod receiving barrel bore or hole 122 and numerous access open portions and rib portions in which operating parts are assembled and covered by an outer tube 124, preferably of steel, secured to the head block by circumferentially spaced screws 126, only two of which are shown in FIG. 1. The tube 124 terminates short of the back end portion of the head; and tube 32 fits on and is fastened to this back portion by circumferentially spaced screws 128 only two of which are shown in FIG. 1. The front face of tube 32 abuts the back face of tube 124, so that the two tubes are in effect continuous.

Figure 12:
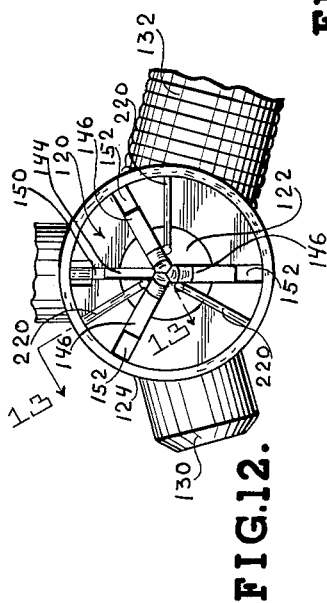
FIG. 12 is a front end view of the stud gun.
Figure 19:
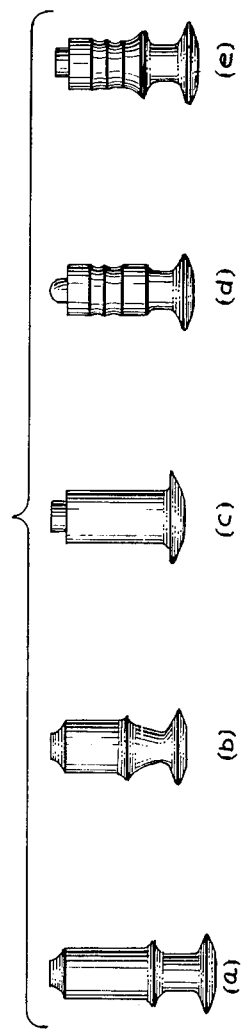

As shown in FIGS. 1, 12 and 17 a pair of similar right and left bosses 130 are welded or otherwise secured to the tube 124 and removably receive a hand grip 132. The grip is secured to the right boss so that it may be held by the right hand in left-handed operation of the stud gun, and is secured to the left boss for right-handed operation.

The back of the head block is solid with a flat back face except for the barrel bore 122 and a recess at the back end of the bore that receives a guide bushing means 134, including a bushing, preferably of Teflon, for piston rod 50, and a small outer recess open at the back end which receives the discharge end of nipple 38. The head block also has an outer circular groove for a sealing O-ring 136. The head block 120 has a front end in the shape of truncated cone beyond the front end of the tube 124.

Intermediate its ends, the head block 120 has a stud-feed hole 138 that extends backwardly and upwardly from the barrel bore 122 and through a boss 139 that extends through a cut-out in outer tube 124. Specifically, the angle between the axes of hole 138 and barrel bore 122 is 30°. The upper part of hole 138 is slightly enlarged and tightly receives a feed pipe 140, preferably of steel, having an internal diameter not less than and preferably the same as that of the bottom part of hole 138. The feed pipe projects beyond the boss 139 so that it may receive an end of a stud feed hose 142 the other end of which fits on the nipple 40.

The hose 142 is made preferably of a transparent or translucent flexible plastic such as polyethylene and serves as a stud magazine or hopper. The hose is of a size to receive the studs practically in single file with their hard end tips upward. The hose can be manually put on and removed from the feed pipe 140 and nipple 40. The top end of the feed pipe 140 is tapered outwardly to prevent snagging of studs as they move from hose 142 into the head assembly 30. The feeding of studs is aided by the air under pressure in hole 41 in nipple 40 which also seeks to vent through hose 142 and interconnected slots in head block 120 that lead to atmosphere at the front. This vent air tends to push the studs in hose 142 forward.

The head block 120 has a number of longitudinal slots that parallel and intersect barrel bore 122 and receive a single stop arm 144 and a plurality, specifically three, of similar jaws 146. The stop arm 144 is operated by piston rod 50 to control the feeding of the studs to the barrel bore 122, one by one; and the jaws 146 are operated by the piston rod to spread the rubber that defines the hole receiving a stud.

The arm 144 is in an upper vertical slot 150 in the upper front part of block 120 in longitudinal line with the center of feed hole 138; and the jaws 146 are in equally angularly spaced radial slots 152, one of which is in the lower or bottom part of the block 120 and is also vertical, as shown in FIGS. 1, 12 and 16. The slots 152 are longer than the slot 150; and all slots are only wide enough to permit the parts mounted therein to operate.

The stop arm 144, preferably of steel, is shaped as shown in FIGS. 2 and 14. The arm comprises a cut-out portion providing a shoulder 154, an arm-operating hump portion 156, a travel guide and limit slot 158, and a narrow stud-stop tip 160.

A guide and stop pin 162 fixed in suitable holes in ribs of the head block 120 passes through the slot 150.

A ball bearing 164 bears against the shoulder 154 and is attached to one end of a compression spring 166. The other end of the spring is anchored to a short pin 167 fixed to tube 124 and projecting into slot 150.

When piston rod 50 moves forwardly from the position shown in FIG. 2, it engages the sloped curved surface 168 of hump 156 and pushes arm 144 to the front as far as pin 162 will permit, as shown in FIG. 14. The hump 156 thereafter rides on the piston rod. Spring 160 is compressed, and stop tip 160 is withdrawn from feed hole 138 so that a stud will drop to the bottom of the feed hole, resting on the piston rod. Upon the return or back stroke of the piston rod, the hump 156 will drop into barrel bore 122 and spring 160 can force stop arm 144 back to the position shown in FIG. 2 where stop tip 160 blocks further feeding of studs into the feed hole.

Figure 15:
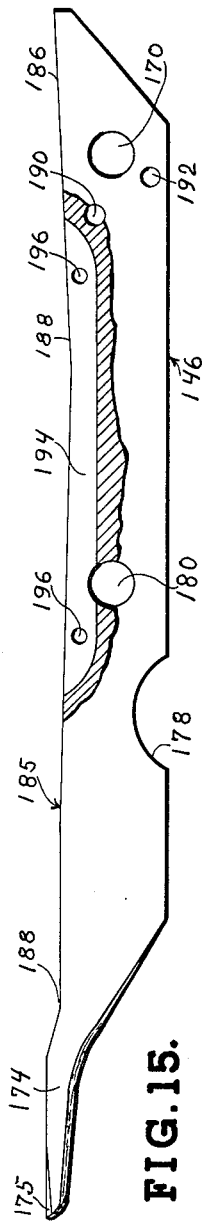
FIG. 15 is a broadside view, with a part in section, of a bottom jaw of the rubber-spreading means.

The jaws 146, preferably of spring steel, are contoured as shown in FIGS. 2, 14 and 15. However, the bottom vertical jaw has additional parts attached thereto that guide and orient a stud dropping in feed hole 138 from the top of piston rod 50 to position in barrel bore 122.

Each jaw at its back end has a pivot hole 170 that is slightly forward of the backmost position of the associated cam 53 on piston rod 50. A pivot pin 172 mounted in head block 120 passes through pivot hole 170 so that each jaw can pivot or turn on the pivot pin. The front end of each jaw comprises a narrow prong 174 forwardly of head block 120. The prongs terminate in narrow triangular-prismatic-like tips 175. A compression spring 176 has one end at the tube 124 and its other end in a semi-circular hole 178 in the outer surface of each jaw 146 and considerably forward of pivot pin 172. The springs of the jaws press their prong-tips toward a point on the axis extended of barrel bore 122 where they meet when piston rod 50 is backward thereof to provide a thin nose adapted to be inserted into the stud-receiving hole of a tire.

As shown in FIGS. 1, 2 and 12, the tips 175 of the three jaws normally firmly meet with abutting faces radially extending from the axis of barrel bore 122, and with meeting edges that extend for a short distance along the axis of the barrel bore, so as to provide, in effect, a solid tip-nose for entry into a tire-hole. It has been found that this arrangement for a strong nose could be further assured against disturbance, as for example by an overlap or crossing of the tips when the nose is most carelessly inserted in a tire-hole, by a tip-position-retaining means comprising a hole 180 in each jaw that receives a ball bearing 182 forwardly of pivot pin 172, that hits the bottom of a hole 184 in the headblock 120 which acts as a stop. As shown in FIGS. 2 and 14, the head block 120 has radial holes 184 to accommodate the springs 176 as well as ball bearings 182. Without the balls 182, the jaws prongs might cross or slip between each other if pressure is placed against a side of the jaw nose, especially during installation of a stud.

Backward of its prong 174, the inner edge of each jaw 146 comprises a camming surface 185 facing barrel bore 122. Because spring 166 always presses on jaw 146 and the cam always rides on, or is in engagement with, the camming surface of the jaw in all positions of the piston rod, the cam is at all times maintained in its groove in the piston rod.

With reference to FIGS. 2 and 15 also, the camming surface 185 of each jaw comprises a sloped portion 186 that extends backwardly of pivot pin 172. The cam 53 is on this sloped portion 186 in back position of the piston rod 50 of the piston means 27 and augments the action of spring 176 to keep the tips of prongs 174 together.

The camming surface 185 of each jaw 146 also comprises an extended portion 188 that is shaped so that a cam will gradually and smoothly open the jaw as the piston rod moves forwardly, the jaw pivoting about its pivot pin 172 and against the action of spring 176. This action occurs simultaneously on all the jaws, so that their tips 175 gradually spread the rubber of a tire hole as the stud is about to leave the stud gun.

Before the piston rod reaches the end of its forward stroke, the stud will hit the bottom of the tire-hole while the tips of the prongs are still in the tire hole as deep as they are placed by the operator, which should be preferably the bottom of the hole. Consequently, further forward movement of the piston rod 50 toward its extreme forward position shown in FIG. 14 cannot drive the stud any deeper into the tire hole, but instead there will be a reaction on the bottom of the tire-hole that will force the stud gun backward, thereby withdrawing the open tips from the tire-hole with the rubber of the tire closing in around the jacket of the stud and holding it. As a result the stud is securely and properly anchored in the tire.

Because of the resistance of the tire to the spreading action of the jaws, it is desirable to have an area of the cams 53 always in contact with the camming surfares 185 of the jaws Furthermore, it is desirable to mount each cam in its semicyclindrical hole in the piston rod so that it can adjust, if necessary, to keep the cam always properly in contact with the jaw.

Upon return movement of the piston rod 50, the cams ride back on the camming surfaces of the jaws smoothly and gradually, so that the jaws 146 and their prongs 174 return to their positions indicated in FIGS. 12 and 14.

Incidentally, the cams 53 also act as anti-rotation means for the piston means 27. The jaws 146 and cams 53 are preferably about the same thickness; and in preferred embodiment the former were each 0.123 inch thick, and the latter 0.120 inch thick. Consequently, a cam dips in the associated slot 152, so that the cam and the piston rod 50 in which it sits are confined essentially to linear movement.

The return movement of piston rod 50 permits the next stud in feed hole 138 riding on the piston rod to drop into barrel bore 122 and be ready for the next working operation of the stud gun.

A stud gun in accordance with the preferred form of the invention has means therein associated with feed hole 138 and barrel bore 122 that assures proper orientation of the released stud as it moves into bore 122. This stud-orienting means is associated, for the most part, with the bottom vertical jaw 146.

The jaws 146, per se, are identical as described so far, but additional parts are mounted in holes in the lower or bottom jaw 146 only to provide the aforesaid stud-orienting means. As shown in FIG. 15, these holes are a transverse hole 190 near but inward and forward of pivot hole 170, a transverse hole 192 near but outward of pivot hole 170, a narrow longitudinal slot 194 within the inner camming surfaced portion of the jaw, and a pair of transverse holes 196 near but spaced inside the ends of the slot 194.

The hole 190 receives a transverse stud-guide pivot pin 200 having projecting ends, each of which receives a stud guide 202, preferably of steel. It is to be understood, of course, that the bottom jaw slot 152 is slightly wider at the stud guides, as shown in FIG. 18, so as to accommodate them and permit them to turn on their pivot pin 200. The guides are close to the sides of the jaw and slot, so that they are confined sidewise on the pivot pin.

With reference to FIGS. 2 and 14, each stud guide 202 has a triangular-like portion with a front edge that is in effect a prolongation of sides of feed hole 138 in up position of the guides. The two stud guides at the sides of the lower jaw 146 therefore provide a spaced two-rail slide that guide a stud coming from feed hole 138 into the barrel bore 122, so that the stud is workably oriented. Because the barrel bore and feeding means have a diameter larger than the largest diameter stud for which the gun is designed, a smaller stud may, without the stud guides, fall uncontrolled into the barrel bore, and into a position that could cause jamming of the gun or damage to the stud. In start position, the guides hold a stud of any smaller diameter and length at no greater angle than the angle of the feed hole to the barrel bore, or specifically 30°.

To further orient such a stud moving into barrel bore 122, slot 194 in the lower vertical jaw 146 receives a narrow concave stabilizing spring 206 having a curved portion in the space between the stud guides 202 and having curved ends under pins 208 spanning slot 194 and anchored in jaw holes 196. In normal position of spring 206, as shown in FIG. 2, its forward portion is substantially in line with feed hole 138 and its highest point somewhat lower than the axis of barrel hole 122, so that it also tends to turn a stud coming from feed hole 138 into barrel bore 122; but its primary purpose is to encourage a stud to slide further forward in the barrel bore and to line up the tip end of the stud substantially with the center line of the piston rod, so as to orient the stud substantially parallel to the barrel bore axis.

To forcibly hold the stud guides in their positions indicated in FIG. 2 when the piston rod 50 is in back position and, as better shown in FIG. 14, the jaw hole 192 tightly receives a pin in 210 with protruding ends that receive a bight or loop in the central part of each leg of a U-shaped wire spring 212, the crosspiece of which presses against the back surface of lower jaw 146. The free ends of the spring are in a small slot in the edge 214 of the stud guide 202 and normally press and guides in the direction of barrel bore 122. In backmost position of the piston rod 50, further upward movement of the stud guides under the force of spring 212 is limited by engagement of stud guide shoulder surface 216 with the piston rod 50 which acts as a stop.

When the piston rod first moves forward, it will press against the back faces of the triangular-like portions of the stud guides 202 and turn the stud against the force of spring 206 so that any stud still on the front guide surfaces of the stud guides will slide forward in barrel bore 122; and when the stud guides are pressed all the way down by the piston rod, by which time stabilizing spring 206 is also down, the stud will be in front of the piston rod with its base end forward and its hard tip end toward the piston rod.

When the forwardly moving piston rod 50 now meets the comparatively stationary stud in the barrel bore 122, the tip end of the stud may enter the stud-tip-receiving groove 52 at the front of the piston rod, or as is more likely the stud will be propelled or be "kicked" forward. The orientation of the stud will now depend on a number of factors, including the angle at which the stud gun is held during the stud-installation, or the pull of gravity on the stud, or the impact of the piston rod on the stud, or even the flow of vent air forwardly through the barrel bore which is even faster than the speed of the rapidly moving piston means, or a combination of such factors.

Figure 13:
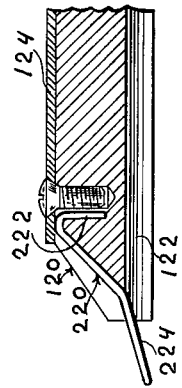
FIG. 13 is a sectional view substantially on the line 13—13 of FIG. 12.

To always insure proper orientation of each stud as it is about to leave the stud gun, a plurality, specifically three, of similar stiff steel wire springs 220 of practically equal stiffness are provided, as indicated in FIGS. 12 and 13. The springs are arranged 120° apart; and each has a radial back part 222 anchored in the forward end of head block 120 with the aid of outer tube 124. Each comprises a sloping leg 224 that slopes forwardly from the periphery of barrel bore 122 to about the center line of the bore where the tip of the leg about meets the tips of the other legs 224, thereby forming in effect a cage just backward of the tips 175 of the prongs 174. The cage serves as a final stud catching and positioning means. An oncoming stud enters the open back of the cage which holds it oriented with its tip end backward so that the end will be caught in the conical groove 52 of the following piston rod. The stiffness of the springs causes the tip end to be firm in the conical hole before they fully open up under the force of the forwardly moving piston means, with the stud correctly oriented for insertion in the tire hole.

This orienting and positioning means of the gun gives it considerable versatility for handling different types of studs and FIGS. 21–a through e illustrate but a few that can be used.

In brief summary, the operation of the stud gun is as follows, assuming that the tips 175 of the prongs 174 of jaws 146 have been placed deeply in a tire hole, that an air hose has been connected to nipple 81, that handle 84 is upright with the piston means back, and that a stud is in barrel hole 122 oriented by guides 202 and stabilizing spring 206:

A twist of handle 84 as far as it can go because of pin 78 will twist valve 96 to select air paths that direct pressurized air to the back face of piston means 27 and direct vent air to atmosphere. Consequently, the piston rod 50 will move forward, depressing guide arms 202 and stabilizing spring 206, and either picking up the stud or driving it forward into the cage of springs 220 where the hard tip end of the stud is firmly caught in groove 52 of the piston rod. In the mean time, the cams 53 on the moving piston rod have started to spread jaws 146, and the tip 160 of the stop arm 144 has been moved forward to release another stud into the empty lower part of feed hole 138. This stud rides on the piston rod.

Continued forward movement of the piston rod spreads the springs 220 and further spreads the jaws 146 to the maximum, so that their tips 175 are fully open, so that the stud passes through and is forced into the tire-hole. The final movement of the piston rod pushes the tips 175 out of the tire-hole, and releases the stud gun for inserting another stud into another tire-hole.

To return the piston means 27 back for the next insertion, the operator twists the handle 84 back until it is again stopped by pin 78. The valve 86 is twisted back to provide different air paths that vent air from the back of the piston 48 and apply pressurized air to its front face, thereby driving the piston means back.

In its initial backward movement the piston rod 50 permits jaws 146 slowly to close and the springs 220 to close the cage they form. Then the tip 160 of the stop arm 144 is inserted as a stop into the line of studs, and the stud orienting spring 206 and guides 202 are pressed back to orient the stud that had been held in feed hole 138 by the piston rod but which now is free to move on into barrel hole 122 and be positioned.

When the piston means has reached its back position, the stud-inserting and feeding operations are ready to be repeated.

While the invention has been described in its preferred embodiment, it and the components thereof are subject to modifications and to general application.

What is claimed is:

1. A portable pneumatic tool of a type described comprising,
 (a) a main cylindrical housing,
 (b) a base block at the back end of said housing, having a valve seat and having a plurality of distinct air-passages leading therefrom,
 (c) a head assembly at the front end of said housing and having a barrel bore,
 (d) a piston means comprising a piston movable in said housing in a working stroke or a return stroke between said base block and head assembly, said piston means including a piston rod affixed to said piston and movable in said barrel bore, said piston rod having a stud-receiving front face,
 (e) means cooperating with said air passages to provide a pair of pneumatic paths selective for moving said piston means in said strokes,
 (f) an actuator means including a valve means on said valve seat and means for moving said valve means to select one or the other of said paths, the last said means including a handle,
 (g) a stud feed mechanism for feeding a stud to said barrel bore for each working stroke of said piston means, whereby said piston rod picks up the stud during the working stroke,
 (h) said head assembly having three angularly spaced jaws with front prongs having tips pressed toward a point in line with said barrel bore, said tips firmly meeting with abutting faces radially extending along the axis of the barrel bore to form in effect a thin solid tip nose of substantial length adapted to be inserted deeply into stud-receiving holes of a tire,
 (i) means operated by said piston means during its working stroke for spreading said prongs to spread the rubber of the stud-receiving holes, and
 (j) means for inserting the studs.

2. A tool as defined in claim 1 but characterized by said valve seat being flat and said valve means having spaced ports, said actuator means further comprising a shaft for twisting said valve means, said handle being secured to said shaft, a selector ring on said shaft having a cut-out portion, and a stop pin extending in said cut-out portion for predetermining the twist of said handle.

3. A tool as defined in claim 1 but characterized by pivot means pivoting said jaws at their back portions, and by said means (i) comprising camming surfaces on said jaws extending forwardly of said pivot means, and cams on said piston rod engaging said camming surfaces to spread said jaws during said working stroke, springs pressing said jaws against the action of said cams, and stop means limiting movement of the jaws inwardly by said springs.

4. A tool as defined in claim 1 but characterized by said piston rod having a front end that reaches a point about at said tips at the end of said working stroke.

5. A tool as defined in claim 4 but characterized by stud positioning means associated with said barrel hole for positioning a stud in said barrel bore to be picked up by front end of said piston rod.

6. A tool as defined in claim 5 but further characterized by pivot means pivoting said jaws at their back portions, said jaws having camming surfaces extending forwardly of said pivot means, cams on said piston rod engaging said camming surfaces during said working stroke, and means pressing said jaws against the action of said cams on said camming surfaces.

7. A tool as defined in claim 5 but characterized by said stud feed mechanism comprising a stud feed hole intersecting said barrel bore at an angle, and said stud positioning means comprising guide arm means having stud-slide surfaces as prolongations in said barrel bore of said feed hole.

8. A tool as defined in claim 7 but further characterized by said stud positioning means comprising a depressible spring in said barrel bore and having a portion forward of said guide arm means.

9. A tool as defined in claim 7 but further characterized by said stud positioning means comprising angularly spaced spring means forming a stud aligning cage in said barrel bore in front of said guide arm means.

References Cited by the Examiner

UNITED STATES PATENTS

| | | | |
|---|---|---|---|
| 550,560 | 11/1895 | Myers | 81—15.7 |
| 982,854 | 1/1911 | Ott | 227—116 |
| 1,081,787 | 12/1913 | Sullivan | 91—467 |
| 2,911,645 | 11/1959 | Crossen | 227—149 |
| 2,956,282 | 10/1960 | McIlvin | 227—119 |
| 3,134,981 | 6/1964 | Demetrakopoulos et al. | 227—112 |
| 3,199,184 | 8/1965 | Harris et al. | 29—211 |

JOHN F. CAMPBELL, *Primary Examiner.*

THOMAS H. EAGER, *Examiner.*